(12) United States Patent
Dalberg

(10) Patent No.: US 7,940,700 B2
(45) Date of Patent: May 10, 2011

(54) METHOD OF DISTRIBUTING MULTIPLE SPANNING TREE PROTOCOL CONFIGURATION

(75) Inventor: Stevin J. Dalberg, Rocklin, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 674 days.

(21) Appl. No.: 11/669,847

(22) Filed: Jan. 31, 2007

(65) Prior Publication Data

US 2008/0181138 A1 Jul. 31, 2008

(51) Int. Cl.
*H04L 12/28* (2006.01)
(52) U.S. Cl. .................. 370/256; 370/252; 370/254
(58) Field of Classification Search .......... 370/256, 370/254, 401, 389, 217, 395.53; 709/220, 709/238, 232, 235
See application file for complete search history.

(56) References Cited

U.S. PATENT DOCUMENTS

| | | | | |
|---|---|---|---|---|
| 7,292,581 B2 * | 11/2007 | Finn | | 370/395.53 |
| 7,480,258 B1 * | 1/2009 | Shuen et al. | | 370/256 |
| 7,551,571 B2 * | 6/2009 | Goldberg et al. | | 370/256 |
| 7,646,733 B2 * | 1/2010 | Tallet et al. | | 370/256 |
| 7,701,881 B1 * | 4/2010 | Sankaran | | 370/256 |
| 7,729,296 B1 * | 6/2010 | Choudhary | | 370/256 |
| 7,760,668 B1 * | 7/2010 | Zinjuvadia | | 370/256 |
| 2003/0053422 A1 * | 3/2003 | Ambe | | 370/256 |
| 2004/0032868 A1 * | 2/2004 | Oda et al. | | 370/389 |
| 2004/0081171 A1 * | 4/2004 | Finn | | 370/395.53 |
| 2005/0013260 A1 * | 1/2005 | Ramanathan et al. | | 370/256 |
| 2005/0259597 A1 * | 11/2005 | Benedetto et al. | | 370/254 |
| 2006/0198323 A1 * | 9/2006 | Finn | | 370/256 |
| 2007/0121672 A1 * | 5/2007 | Kang | | 370/466 |
| 2007/0258390 A1 * | 11/2007 | Khan et al. | | 370/256 |
| 2007/0263554 A1 * | 11/2007 | Finn | | 370/256 |
| 2008/0089245 A1 * | 4/2008 | Reichstein et al. | | 370/256 |
| 2008/0165704 A1 * | 7/2008 | Marchetti et al. | | 370/256 |
| 2010/0085899 A1 * | 4/2010 | Tallet et al. | | 370/256 |

OTHER PUBLICATIONS

IEEE 802.1Q, "Virtual Bridged Local Area Networks", published May 2005 by the IEEE Computer Society. See whole document.*
NPL document: "Virtual Bridged Local Area Networks", IEEE 802.1Q (hereinafter IEEE 802.1Q) published by the IEEE Computer Society.*
Virtual Bridged Local Area Networks, IEEE 802.1Q. Published May 2006 by the IEEE Computer Society.*
NPL Document: "Virtual Bridged Local Area Networks", IEEE 802.1Q (hereinafter IEEE 802.1Q), Published by the IEEE Computer Society, May 2005.*

* cited by examiner

*Primary Examiner* — Michael J Moore, Jr.

(57) ABSTRACT

A system and method of distributing a Multiple Spanning Tree Protocol (MSTP) configuration to at least one Ethernet switch. The method comprises assigning an Ethernet switch as a server switch. Based upon a configurable operation mode of the server switch and a configurable operational mode of at least one Ethernet switch configured as a client switch, the server switch is operable to transmit a MSTP configuration to the at least one client switch.

20 Claims, 4 Drawing Sheets

METHOD OF DISTRIBUTING MULTIPLE SPANNING TREE PROTOCOL CONFIGURATION

BACKGROUND

A particular communication standard, i.e., IEEE Std 802.1Q, specifies the operation of virtual local area network (VLAN) bridges, which support VLAN operation within an IEEE 802 bridged LAN.

Multiple active paths between stations cause loops in the network. If a loop exists in the network topology, the potential exists for duplication of messages. When loops occur, some switches see stations appear on both sides of the switch. This condition confuses the forwarding algorithm and allows duplicate frames to be forwarded.

A Spanning-Tree Protocol (STP) prevents loops from being formed when switches or bridges are interconnected via multiple paths.

STP is a link management protocol that provides path redundancy while preventing undesirable loops in the network. For an Ethernet network to function properly, only one active path can exist between two stations.

To provide path redundancy, STP defines a tree that spans all switches in an extended network. STP forces certain redundant data paths into a standby (blocked) state. If one network segment in the STP becomes unreachable, or if STP costs change, the spanning-tree algorithm reconfigures the spanning-tree topology and reestablishes the link by activating the standby path.

Multiple Spanning Tree Protocol (MSTP) is a protocol that allows groups of VLANs to have different spanning tree topologies within an Ethernet Network. MSTP was introduced in IEEE 802.1s as amendment to 802.1Q, 1998 edition and adds the facility for VLAN bridges to use multiple spanning trees, providing for traffic belonging to different VLANs to flow over potentially different paths within the virtual bridged LAN. This allows for better load balancing and more efficient use of available resources.

In order to operate properly, the configurations must be identical on all switches. However, configuring MSTP on Ethernet switches can be a cumbersome and complex task, relying on a command-line interface (CLI) present on each individual switch.

The CLI is the primary user interface used for configuring, monitoring, and maintaining switch products. This user interface provides execution of entered commands, whether using a router console or terminal, or using remote access methods. It does, however, permit modification of only one switch at a time. Once an initial deployment of switches is performed, each time VLANs are added, moved, or deleted from an instance, each switch must again be accessed.

Accordingly, one of the large inhibitors of deploying MSTP is the complexity and tediousness of the deployment, plus the necessity to touch all devices in order to add a VLAN or instance of MSTP.

DESCRIPTION OF THE DRAWINGS

The present invention is illustrated by way of example, and not by limitation, in the figures of the accompanying drawings wherein elements having the same reference numeral designations represent like elements throughout and wherein.

DETAILED DESCRIPTION

The methods described herein allow MSTP information to be managed from one location and automatically propagated to remaining switches in a network, thereby, in some embodiments, eliminating misconfiguration and wasted time and energy caused by a typographical error. Furthermore, the disclosed method permits a network administrator to know exactly how switches in the network are configured, and be assured that the MSTP topology is properly and optimally configured.

Figure 1:
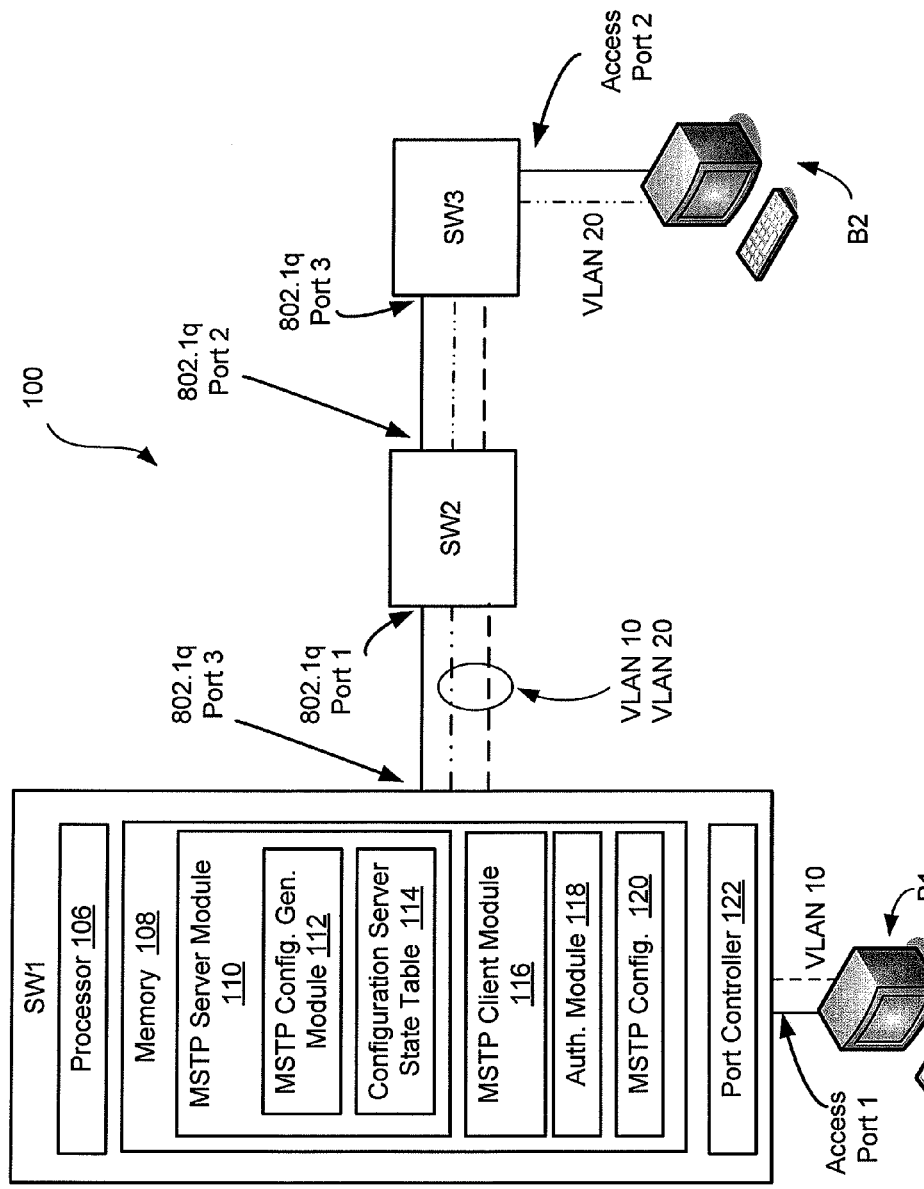
FIG. 1 is a system block diagram of a network topology incorporating MSTP and a method of distributing an MSTP configuration according to an embodiment of the present invention.

The block diagram of FIG. 1 illustrates a multiple VLAN network 100 comprising Ethernet switches SW1-SW3 with interconnecting 802.1q tagged links (3), (1, 2), and (3), on switches SW1-SW3, respectively. In FIG. 1, switch SW1 has assigned access port 1 with VLAN 10 connecting station B1 and switch SW3 has access port 2 with VLAN 20 connecting station B2. Stations B1 and B2 are computing systems, e.g., application-specific integrated circuit-based and/or processor-based systems.

Level 2 (L2) Ethernet switching allows packets to be switched in the network based on their Media Access Control (MAC) address. When a packet arrives at the switch, the switch checks the packet's destination MAC address and, if known by the switch, sends the packet to the output port from which the switch learned the destination MAC.

The two fundamental elements in Ethernet L2 switching are the MAC address and the virtual LAN (VLAN). In the same way that IP routing references stations on the networks via a Level 3 (L3) IP address, Ethernet L2 switching references end stations via the MAC address.

Ethernet is a broadcast medium. Without the concept of VLANs, a broadcast sent by a station on the LAN of FIG. 1 is sent to all physical segments of the switched LAN. The VLAN concept allows the segmentation of the LAN into logical entities, and traffic is localized within those logical entities. For example, a university campus can be allocated multiple VLANs—one dedicated for faculty, one dedicated for students, and the third dedicated for visitors. In FIG. 1, stations B1 and B2 are in different VLANs and accordingly are isolated from each other. Broadcast traffic within each of these VLANs is isolated to that VLAN.

Broadcast is used to enable clients to discover resources that are advertised by servers. When a server advertises its services to its clients, it sends broadcast messages to MAC address FFFF FFFF FFFF, which indicates a transmission to "all stations." End clients listen to the broadcast and pick up only the broadcasts they are interested in, to minimize their CPU usage. With multicast, a subset of broadcast, a station sends traffic only to a group of stations and not to all stations. Broadcast and multicast addresses are treated as unknown destinations and are flooded over all ports within a VLAN.

Although Ethernet switch SW1 is illustrated in greater detail, Ethernet switches SW1-SW3 are essentially the same. Each switch SW1-SW3 comprises a processor 106, a memory 108, and a port controller 122.

L2 switching is accomplished in switches SW1-SW3 using MSTP and accordingly, each switch comprises an identical MSTP configuration 120. Furthermore, network 100 is operable to distribute an MSTP configuration from a single server switch to multiple client switches.

Although each switch SW1-SW3 comprises MSTP server software, i.e., MSTP server module 110, and MSTP client software, module 116, a first function is to designate a switch, i.e., switch SW1, within the network 100 to be the master, i.e., the MSTP configuration server. Configuring SW1 may be accomplished by using station B1 and a command line interface (CLI) included by default within SW1.

Once selected, the MSTP configuration server must be configured with the MSTP configuration 120 that is intended to be used by switches, SW1-SW3 on network 100. MSTP configuration 120 includes revision and name, both required fields for a MSTP configuration, as well as instance configurations and root priorities, which may be specified using switch MAC addresses. The server switch SW1 periodically publishes to the network 100 that the switch is running, and which MSTP configuration 120 is current. Each time the MSTP configuration 120 changes, the revision number is incremented automatically.

Remaining switches, SW2-SW3, in network 100 are configured as client switches by issuing commands via a CLI. The commands further identify the MSTP configuration server, e.g., by MAC address, and configure security parameters, e.g., authentication information, for subsequent server/client communication.

The communication mechanism between server SW1 and clients SW2-SW3 is L2 based, is configurable by the user and in some embodiments are broadcast. In other embodiments, the mechanism may be unicast or multicast. Through periodic announcement packets that contain a change in revision number, the server SW1 announces that a new configuration 120 is available. Client switches then request MSTP configuration 120 which is then sent by the server SW1.

Once an MSTP configuration 120 is loaded, a client switch, e.g., SW2, publishes an announcement, e.g., via a broadcast, multicast, or unicast message, that the update was completed or failed, and if failed, includes an error message or code.

Figure 2:
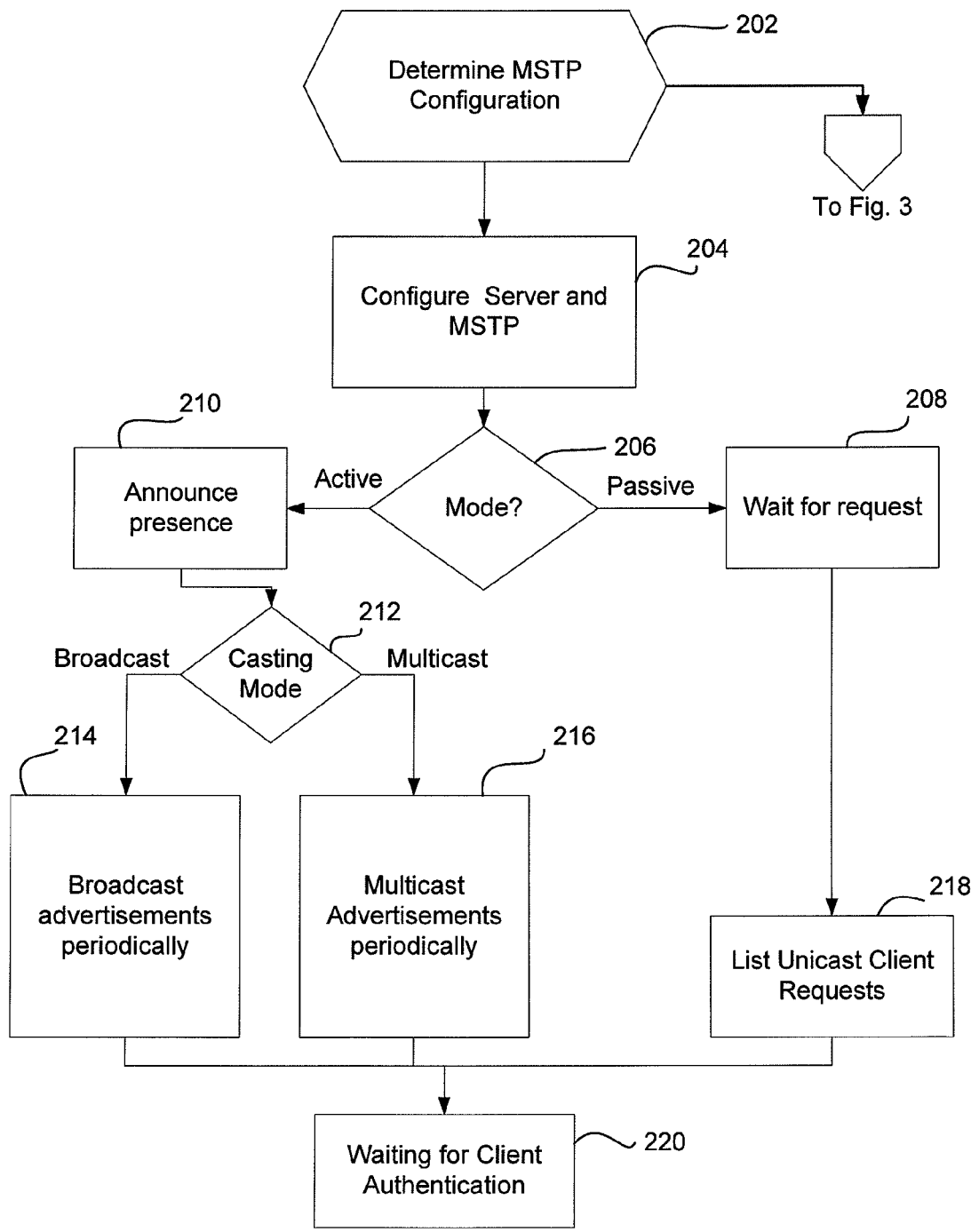
FIG. 2 is a flow chart illustrating a method of configuring an MSTP configuration server according to an embodiment of the present invention.
Figure 3:
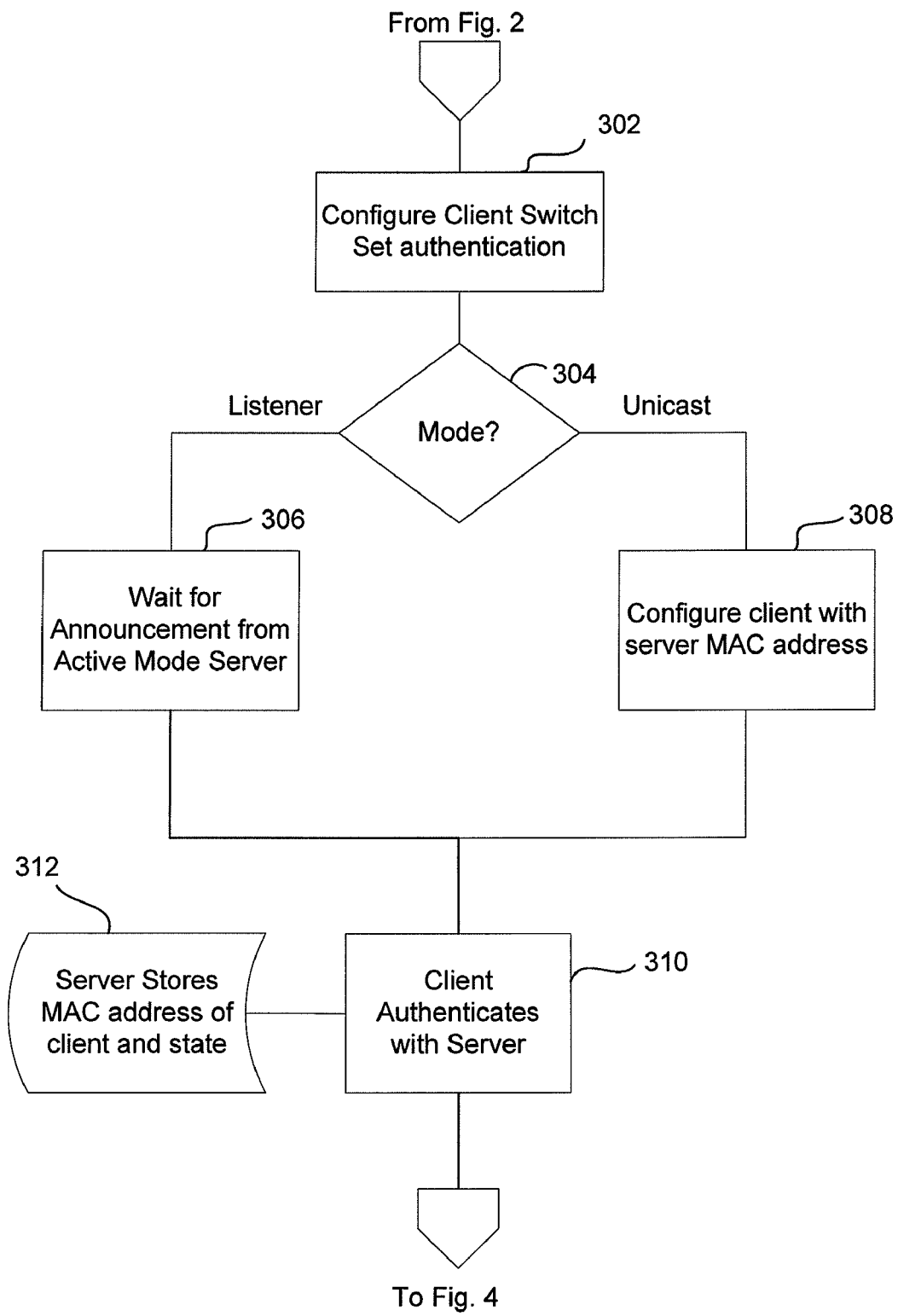
FIGS. 3-4 are flowcharts illustrating an embodiment of a method whereby an Ethernet switch is configured as an MSTP client switch and receives an MSTP configuration from an MSTP configuration server switch according to an embodiment of the present invention.
Figure 4:
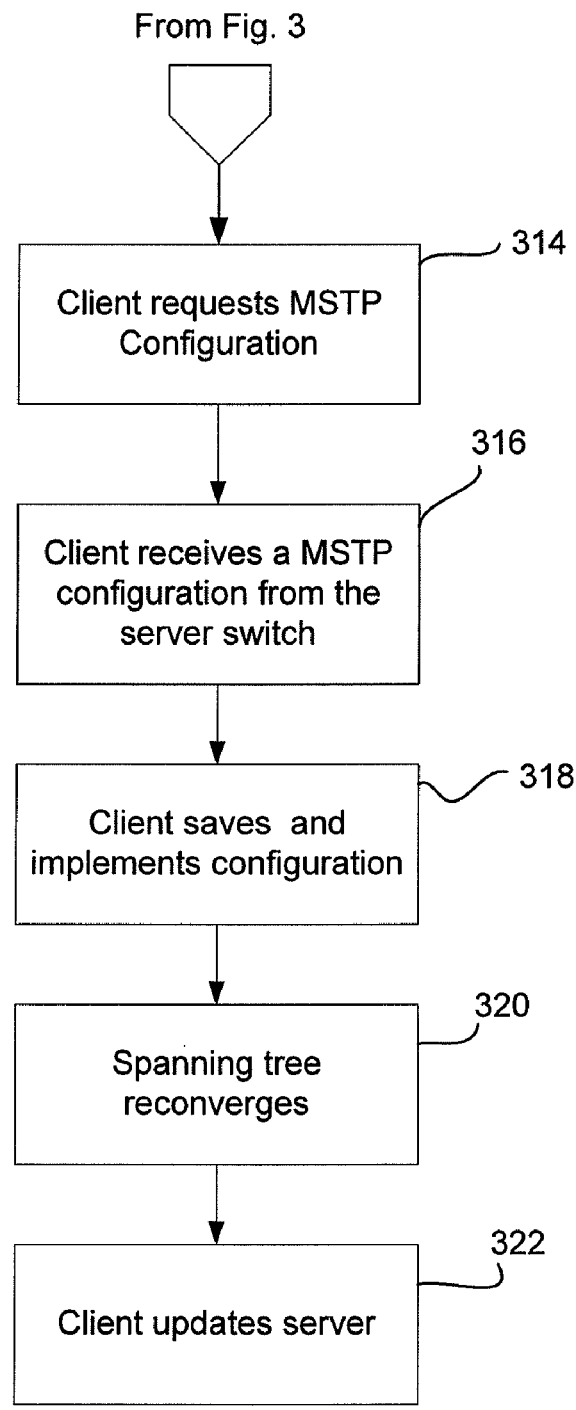

The flowcharts of FIGS. 2-4 illustrate one embodiment of a method whereby Ethernet switches in a network topology are configured to comprise a single MSTP configuration server, the remaining switches being configured as client switches. FIGS. 2-3B further illustrate wherein an MSTP configuration is generated by the designated MSTP server, i.e., SW1, and is propagated to all client switches, i.e., SW2-SW3, in network topology 100.

FIG. 2 illustrates wherein a first function 202, performed by software residing in an Ethernet switch, e.g., SW1, determines, based upon input from a user, whether to configure the switch as the network's MSTP configuration server or as a client switch. If the switch is selected as the server switch, the switch software executes MSTP server module 110, permitting the user, at function 204, to configure an MSTP configuration 120 using MSTP configuration generator module 112. Alternatively, if the switch is to be a client switch, control is passed to MSTP client module 118 at function 302 in FIG. 3.

An MSTP configuration server comprises a function 206 of being user configured to operate in either an active mode or a passive mode. An MSTP configuration server configured for active mode comprises the function 210 of announcing the availably of a new/revised MSTP configuration to the client switches on the network. Depending upon a user configurable function 212, the MSTP configuration server either executes function 214 that broadcasts advertisements periodically to switches in the network, or executes multicast function 216 to selected groups of switches. Alternatively, an MSTP configuration server configured for passive mode performs a function 208, waiting for a unicast transmission from a client server switch maintaining, at function 218, a list of client requests.

Broadcasting, multicasting, and unicast transmissions are known techniques in the field of networking. Unicast is the term used to describe communication where a piece of information is sent from one networked device to another networked device. In this case, there is one sender, and one receiver. IP multicast provides dynamic many-to-many connectivity between a set of senders (one sender, SW1, in this embodiment) and a group of receivers, e.g., SW2-SW3. The format of IP multicast packets is identical to that of unicast packets and is distinguished only by the use of a special class of destination address (class D IP address) which denotes a specific multicast group.

Regardless of whether the MSTP server SW1 switch is configured for active or passive operation, the MSTP server switch includes a function 220 that waits for the clients, SW2-SW3, to initiate authentication with the server SW1.

FIGS. 3 and 4 illustrate the functions performed by Ethernet switches, SW2-SW3, which are designated by a user, at function 302, as MSTP client switches. Once designated as an MSTP client, the Ethernet switch, e.g., SW2-SW3, executes MSTP client module 116, and at function 304 is configured by the user to operate in either a "Listener" or "Unicast" mode. In Listener mode, function 306 of client module 116 places the client switch in a state whereby the switch waits for receipt of an announcement of a new/revised MSTP configuration 120 (generated by an active mode MSTP configuration server, i.e., SW1, at functions 214 and 216). Alternatively, a client switch, e.g., SW2-SW3, configured for unicast mode has stored therein the MSTP configuration server's MAC address and unlike Listener mode, initiates communication with the server switch SW1.

In some embodiments, an Ethernet switch may be assigned a default client switch configuration. Such a default configuration may automatically put the client switch in Listener mode without requiring a user to login in and configure the switch to accept broadcast or multicast advertisements from a server switch.

At function 310, client switches SW2-SW3 authenticate with the server switch SW1. In some embodiments, authentication is based upon the IEEE 802.1x Port Authentication standard. At function 312, the MSTP server switch SW1 maintains the MAC address and state of the client switch, SW2-SW3, in the configuration server state table 114.

After authentication, at FIG. 4 function 316, a client switch, e.g. SW2, SW3, receives MSTP configuration 120 from the server switch SW1 in response to a request, function 314, from the client switch.

At function 318, a client switch saves and implements the MSTP configuration 120. Propagation delays may occur when protocol information is passed through a switched LAN. As a result, topology changes can take place at different times and at different places in a switched network. Ports must wait for new topology information to propagate through the switched LAN before starting to forward frames. They must also allow the frame lifetime to expire for frames that have been forwarded using the old topology.

At function 322, the client switch transmits a message to the MSTP configuration server switch SW1 causing the server switch to update the configuration server state table 114 with the latest MSTP revision for each client switch SW2-SW3.

Based upon the above description, a network administrator can manage the L2 environment of a high number of Ethernet switches from a single switch, without depending upon a vendor specific tool to connect to, and update, the MSPT configuration in each switch.

The functions of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

What is claimed is:

1. A method of distributing a Multiple Spanning Tree Protocol (MSTP) configuration to at least one Ethernet switch, comprising:
    configuring an Ethernet switch as a server switch;
    assigning at least one of an active operational mode and a passive operational mode to the server switch;
    transmitting an MSTP configuration from the server switch to at least one Ethernet switch configured as a client switch, wherein the MSTP configuration includes configurations loadable by the client switch to allow the client switch to connect to a spanning tree; and
    operating the server switch in the assigned operational mode, wherein in the active operational mode, the server switch announces a new or revised MSTP configuration to the client switch, and in the passive operational mode, the server switch waits and receives a request for a MSTP configuration from the client switch.

2. The method of claim 1, further comprising generating on the server switch an MSTP configuration operational on the client switch.

3. The method of claim 1, wherein transmitting an MSTP configuration to at least one client switch further comprises:
    waiting on the server switch for authentication of the at least one client switch prior to transmitting the MSTP configuration.

4. The method of claim 1, further comprising:
    maintaining on the server switch an MSTP configuration server state table comprising a MAC address and state of the at least one client switch;
    transmitting the MSTP configuration to the at least one of the client switch; and
    updating an MSTP configuration server state table on the server switch based on receipt of an update completed message from the at least one client switch.

5. The method of claim 1, further comprising:
    transmitting a checksum along with the MSTP configuration.

6. The method of claim 1, further comprising:
    broadcasting an MSTP configuration advertisement to the network.

7. The method of claim 1, further comprising:
    multicasting an MSTP configuration advertisement to the network.

8. The method of claim 1, wherein the MSTP configuration comprises a revision, a name, an instance configuration and root priorities.

9. The method of claim 1, wherein the server switch is assigned to the passive operational mode, the method further comprising:
    waiting for a unicast request from the client switch.

10. A method of distributing a Multiple Spanning Tree Protocol (MSTP) configuration to at least one Ethernet switch, comprising:
    configuring an Ethernet switch as a client switch;
    configuring an Ethernet switch as a server switch;
    assigning the client switch to operate in one of a listener mode and a unicast mode;
    receiving on the client switch an MSTP configuration from the server switch;
    implementing on the client switch the MSTP configuration received from the server switch, wherein the MSTP configuration includes configurations loadable by the client switch to allow the client switch to connect to a spanning tree; and
    operating the client switch in the assigned operational mode, wherein in the listener mode, the client switch waits and receives an announcement of a new or revised MSTP configuration from the server switch, and in the unicast mode, the client switch initiates communication with the server switch to request a MSTP configuration.

11. The method of claim 10, further comprising setting an authentication setting on the client switch.

12. The method of claim 10, wherein the client switch further comprises the functions of:
    receiving a checksum along with the MSTP configuration; and
    verifying the validity of the MSTP configuration based upon the received checksum.

13. The method of claim 10, further comprising allowing a current MSTP configuration to be updated only at a predetermined time.

14. The method of claim 10, further comprising updating a current MSTP configuration change automatically upon validation of the received MSTP configuration.

15. The method of claim 8, further comprising transmitting an update message to the server switch operable on the server switch to update an MSTP configuration server state table.

16. A computer program product, comprising:
    a non-transitory computer-readable medium storing:
    a first set of codes for causing an Ethernet switch to be assigned as a server switch operable in an active operational mode and a passive operational mode;
    a second set of codes for causing the server switch to operate in at least one of the active operational mode and the passive operational mode; and
    a third set of codes for causing the server switch to transmit an MSTP configuration to at least one Ethernet switch configured as a client switch, wherein the MSTP configuration includes configurations loadable by the client switch to allow the client switch to connect to a spanning tree; and
    wherein in the active operational mode, the server switch announces a new or revised MSTP configuration to the client switch, and in the passive operational mode, the server switch waits and receives a request for a MSTP configuration from the client switch.

17. An Ethernet switch operable to propagate an MSTP configuration to at least one other Ethernet switch, comprising:
    a processor; and
    a memory, the memory further comprising:
    an MSTP server module; and
    an MSTP client module;
    wherein an Ethernet server switch executing the MSTP server module is operable to transmit an MSTP configuration to an Ethernet client switch executing the MSTP client module, wherein the MSTP configuration includes configurations loadable by the Ethernet client switch to allow the Ethernet client switch to connect to a spanning tree; and wherein the Ethernet server switch is operable in an active operational mode and a passive operational mode, wherein in the active operational mode, the Ethernet server switch announces a new or revised MSTP configuration to the Ethernet client switch, and in the passive operational mode, the Ethernet server switch waits and receives a request for a MSTP configuration from the Ethernet client switch.

18. The Ethernet switch of claim 17, wherein the MSTP server module comprises:

a MSTP configuration generator module; and a MSTP configuration server state table.

19. The Ethernet switch of claim 18, wherein the MSTP configuration server state table comprises a machine access control (MAC) address of at least one Ethernet switch executing the MSTP client module.

20. The Ethernet switch of claim 19, wherein the memory further comprises an authorization module operable to authenticate the at least one Ethernet switch executing the MSTP server module to the Ethernet switch executing the MSTP server module.

* * * * *